Patented Sept. 4, 1951

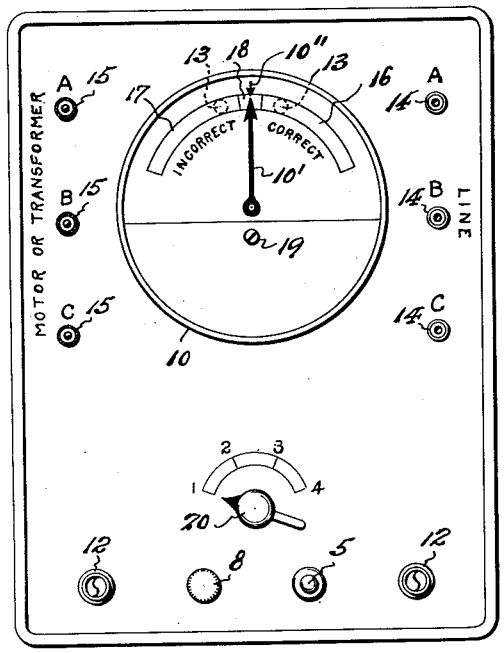
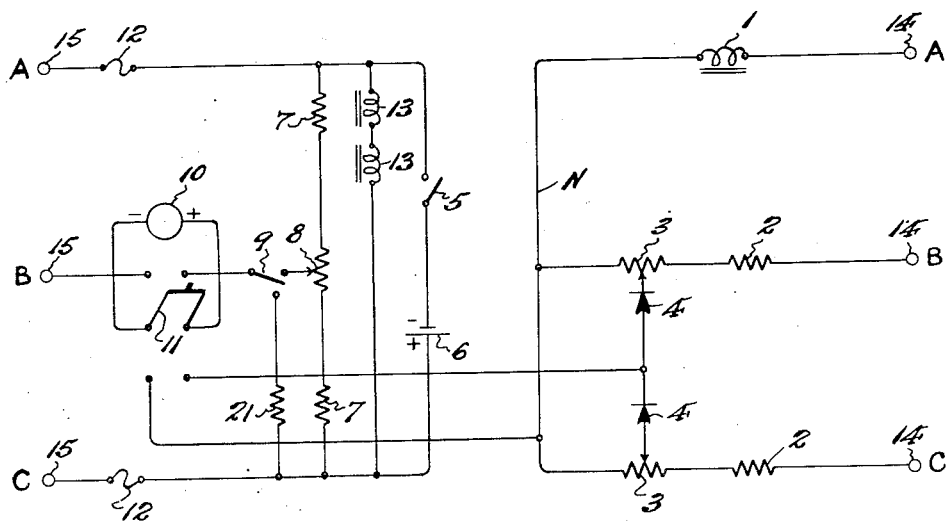

2,566,726

UNITED STATES PATENT OFFICE 2,566,726

PHASE ROTATION AND POLARITY TESTING INSTRUMENT

Raymond A. Huse, Cranford, and Frazer W. Gay, Metuchen, N. J.

Application October 20, 1950, Serial No. 191,214

14 Claims. (Cl. 175—183)

This invention relates to a phase and polarity testing instrument, and, more particularly, to a testing instrument which is operative both to determine that phase rotation of an A.-C. electric power circuit and that phase rotation of an A.-C. motor winding required to produce a desired direction of motor rotation when similarly marked leads of the power circuit are connected to similarly marked terminals of the motor winding.

There is need for a single testing instrument which can be used for determination of both power phase rotation and motor direction rotation, and which will also have a wide range of voltage application, but heretofore a single testing instrument operative for such multiple purposes has not been available.

It is therefore an object of this invention to provide a testing instrument having a novel arrangement of circuits which are so related and coordinated that the instrument can be used for the aforesaid multiple purposes, as well as for many other kinds of polarity determinations; and to such end the present invention seeks to especially provide in a single testing instrument novel means for determining the required lead markings of a three phase motor which, when properly connected to a power source, will produce a desired direction of rotation of the motor, and to also make the instrument available for determination of the phase rotation markings of a power source circuit, so that, when the marked leads on the motor are connected to correspondingly marked leads of the power source circuit, rotation of the motor in the direction desired will be assured.

Another object of this invention is to provide a single testing instrument having one set of connections for a power source circuit and another set of connections for a motor test circuit, and to provide these respective sets of connections with different types of terminals so that the motor winding leads adapted and to be marked for determining motor rotation will not be accepted by the terminals adapted and to be marked for power source phase rotation, and vice versa, and consequently there will be no reasonable possibility of connecting a relatively high voltage power source to a relatively low voltage motor test circuit with attendant risk of injury to or destruction of the instrument.

It is another object of this invention to provide, in a testing instrument for the stated purposes, a switch means which is so arranged that when said switch means is thrown to a selected position, e. g. to a motor test position, there is no possibility of high voltage power source currents passing to the low voltage motor test circuits, and, conversely, when the switch means is thrown to power source circuit connection, the instrument reading indicates only the phase rotation of the power source circuit, so that again there is no possibility of connecting the more sensitive motor circuits to the power source circuits.

Another object of this invention is to provide a neutral center reading meter including indicating scale means having indicator sections oppositely extending from neutral center which are respectively characterized or marked for correct rotation indication and for incorrect rotation indication.

It is a further object of this invention to provide, in an instrument for the stated purposes, a meter having an indicator needle of magnetic material, and to further provide electro-magnetic means respectively related to the respective indicator sections of the meter which oppositely extend from the neutral center of its indicating scale means, whereby when the indicator needle swings to an indicator section it will be held by the associated electro-magnetic means in its first thrown position against oscillation.

This invention also has for an object to provide the power source phase rotation testing circuit of the testing instrument with dual potentiometer resistors, said resistors each having contact points so interconnected that equal resistances are tapped into the meter circuit on each resistor at every point, whereby equal low resistances are tapped off for meter readings on relatively high voltage circuits and equal high resistances are tapped off for meter readings on relatively low voltage circuits.

It is also an object of this invention to provide, in a testing instrument for determining the phase rotation of A. C. motor windings for a desired direction of rotor rotation, two resistances and a balancing resistance so that the exact voltages of the connecting point of the non-excited winding to the excited winding may be adjusted to zero with the rotor stationary and the direction of instrument indication, when the rotor is turned slightly in the desired direction, will indicate the phase rotation of the windings, and the protective resistances will act in multiple to the voltage induced by said turning of the rotor.

Another object of this invention is to provide a testing instrument for the stated purposes which includes means adapted to condition the same for determination of additive or subtractive connections of a transformer.

The above and other objects of this invention will be understood from the following detailed description of the same.

An illustrative embodiment of the invention is shown in the accompanying drawings, in which:

Fig. 1 is a face view of a testing instrument according to this invention; and Fig. 2 is a wiring diagram showing the circuits and electrical agencies which comprise said testing instrument.

Similar characters of reference are employed in the aforesaid figures of the drawings, to indicate corresponding parts.

Referring to said drawings, the terminals 14, respectively marked A, B and C, are the terminals of the testing instrument to which power source circuit leads are to be connected for determination of the phase rotation of said circuit, and the terminals 15, respectively marked A, B and C, are those to which leads of equipment to be tested for phase rotation or polarity are to be connected. Preferably the terminals 14 are of a type different from the terminals 15, so that power circuit leads while acceptable by the terminals 14 will not be acceptable by the terminals 15, and equipment leads while acceptable by terminals 15 will not be acceptable by terminals 14. For example, the terminals 14 can be of the push plug receptacle type, while the terminals 15 are of the binding post type.

The reference character 10 indicates a polarized D. C. meter, provided with a pivoted indicator needle 10' made of magnetic material which is cooperative with an indicating scale. An adjusting screw 19 is provided for centering the indicator needle 10' at the neutral mid-point of the indicating scale in manner already known to the art. The indicating scale is so divided as to provide a neutral central zone or section 18 including a central mark 10'' relative to which the indicator needle 10' may be adjusted to a centered neutral initial position. Extending in one direction from the neutral central zone 18, e. g. to the right, the indicating scale is provided with a zone or section 16 indicative of correct polarity, and extending in the opposite direction from said neutral central zone 18, e. g. to the left, the indicating scale is provided with a zone or section 17 indicative of incorrect polarity. Said zones or sections 16 and 17 may be respectively suitably labeled to denote "correct" or "incorrect." For quick reading, however, it is desirable that said zones be contrastingly colored. For example, the section or zone 16 may be colored green to indicate correct polarity, while the section or zone 17 may be colored red to indicate incorrect polarity. The neutral central zone 18, in such case would preferably be white in color. The poles of electro-magnetic elements 13 are suitably related to the respective indicator sections or zones 16 and 17 so as to function, at the first throw of the indicator needle 10', to hold the indicator needle 10' in the indicating position to which it is moved by operation of the testing instrument. The indicator needle 10' will be released for return to neutral or zero position when said electro-magnetic elements are demagnetized.

A manipulatable switch actuating means 20 (see Fig. 1) is provided and can be selectively moved to any one of four indicated positions. When disposed in its first position, said switch actuating means 20 operates to open switches 11 and 9, push button switch 5 being normally open.

In its second position, said switch actuating means 20 conditions the testing instrument for phase rotation determination of a power source circuit, and operates to close switch 11 in direction to connect the power source circuit to be tested with meter 10, the switch 9 and push button switch 5 remaining open. In its third position, the switch actuating means 20 conditions the testing instrument for phase rotation determination of motor windings, and operates to close switch 11 in direction to connect said motor windings to be tested with meter 10 and at the same time to close switch 9 to establish the motor test circuit of the testing instrument, whereby said motor test circuit may be finally completed by manually closing push button switch 5. In its fourth position, the switch actuating means 20 conditions the testing instrument for determination of additive or subtractive connections of a transformer, and operates to close switch 11 in direction to connect transformer leads with the meter 10, and at the same time closes switch 9 in direction to establish the transformer test circuit of the instrument, whereby said circuit can be finally completed by manually closing push button switch 5. The motor and transformer test circuits include fuses 12. These fuses are not essential for proper operation of the circuits, but are desirably used to afford protection to the operator in case a high voltage power source is inadvertently applied to the motor or transformer lead receiving connections or terminals of the testing instrument.

In the testing instrument, line terminal 14A is connected to neutral N through reactor 1, and line terminals 14B and 14C are connected to neutral N each through a fixed resistor 2 and a variable resistor 3. After the leads of a power line, the phase rotation of which is to be determined, are connected to the respective line terminals 14, the switch actuating means 20 is moved from its first position to its second position, thereby moving switch 11 to its line testing circuit establishing position, the switches 9 and 5 remaining open. Under these conditions, the direct current meter 10 is connected between the mid-point of rectifiers 4—4 and the neutral N.

Before the switch actuating means is moved from its first position so that switch 11 is open, the indicator needle 10' of the meter 10 may be adjusted to alignment with the mid-point mark 10'' of the indicating scale by manipulating the adjusting screw 19 in manner well known to the art. Two of the line leads being respectively connected to terminals 14B and 14C, when the switch actuating means 20 is moved from its first to its second position, so as to close switch 11 for line testing circuit establishment, resistor 3 in line B and resistor 3 in line C are adjusted and locked together so that the indicator needle 10' remains at zero or mid-point 10'' of the indicating scale. It will be understood that under these conditions the push button switch 5 is open, and consequently the electro-magnets 13 are not energized, and need not be since in a line phase rotation determining test the deflection of the indicator needle 10' is constant. If the resistors 3—3 are simultaneously moved in the same direction while the indicator needle 10' is held in zero position, the sensitivity of the instrument may be increased for testing a low voltage source by regulating said resistors 3—3.

A three phase power source line phase being connected to terminal 14A of the testing instrument, the reactor 1 in test circuit branch or phase leading from terminal 14A to neutral N will displace more voltage across the resistor 3 in the test circuit branch or phase leading from terminal 14C than across the resistor 3 in the test circuit branch or phase leading from terminal 14B, if phase rotation of the power source is in correct sequence. Therefore rectifier 4 which is connected with terminal 14C will pass more current than rectifier 4 which is connected with terminal 14B, and the differential current will pass through meter 10 in the direction to cause it to deflect the indicator needle 10' to the right, i. e. to correct indication position.

On the other hand, if the phase rotation of the power source circuit instead of being in correct sequence i. e. ABC, is in incorrect sequence, e. g. CBA, resistor 3 in the test circuit branch or phase leading from terminal 14B will have the greater voltage across it and rectifier 4 which is connected with terminal 14B will pass more current than rectifier 4 which is connected with terminal 14C, and consequently deflection of the indicator needle 10' of meter 10 will be to the left, i. e. to incorrect indication position. In such case, the two line phase connections to the testing instrument should be reversed and a recheck will then show a meter reading indicative of correct phase rotation. The line leads may then be marked with markings corresponding to the A, B and C terminals 14, to which they are connected in correct sequence.

Having determined the correct rotation of the power line phases and marked the line leads accordingly, the switch actuator means 20 is shifted to its third position preparatory to determination of correct connection of machine windings to the power source circuit whereby to assure motor rotation in a desired direction. When the switch actuator means 20 is moved to its third position, switches 11 and 9 are closed to establish the motor test circuit of the instrument, push button switch 5 remaining open. If a three phase motor is to be tested, the three leads of its windings are respectively connected to respective binding posts 15. When these connections are made, push button switch 5 is closed and the rotor of the motor is then quickly turned a few degrees in desired direction of rotation. If the phase sequence of the motor windings is in correct order for desired motor rotation, upon turning of the rotor, the resultant voltage induced in the windings connected to 15A, 15B and 15C will pass a current through meter 10 which causes deflection of the indicator needle 10' to the right, i. e. to correct indication position. Closing of push button switch 5 closes a circuit through which a current from a D. C. source 6 is delivered through the electro-magnets 13 whereby to energize the same, whereby the deflected indicator needle 10' will be held stationary in the position of its first throw free from oscillation. The motor winding leads, being indicated to be in correct phase rotation, the same are then marked ABC to correspond to the markings of the binding posts 15 to which they are connected.

If in such motor test, the indicator needle 10' swings to the left, i. e. to incorrect indication position, improper phase rotation sequence of the motor windings is shown. In such case, switch actuator means 20 is shifted back to its first position to open switches 11 and 9, and push button switch 5 being released and open, the electro-magnets 13 will be deenergized so that the indicator needle 10' can swing back to center or zero position. The motor winding leads connected to binding posts 15A and 15B are interchanged, and, upon returning switch actuator means 20 to its third position, a new check is made. When this new check is made, the indicator needle 10', since the motor winding leads by the aforesaid interchange are brought into proper phase rotation sequence, will swing to the right, i. e. to correct indication position, whereupon said motor winding leads may then be marked A, B and C to correspond to the markings of the binding posts 15 to which they are connected. Correct phase rotation of both the line and the motor windings having been thus ascertained, the motor winding leads respectively marked A, B and C can be respectively connected to the power line leads correspondingly marked, so that rotation of the motor in desired direction will be assured.

In the motor test circuits of the instrument, if the motor phase resistances 7—7 are not in perfect balance, adjustment of the indicator needle 10' to register with mid-point 10'' of the indicating scale of the meter 10 may be made by regulating the rheostat 8 until balance of resistances 7—7 is attained. Such adjustment will rarely be necessary unless there is an unbalance in the resistance of the motor winding circuits or leads.

If it is desired to test a transformer, switch actuator means 20 is shifted to its fourth position, whereby switch 9 is thrown to transformer test circuit establishing position which test circuit includes a resistance 21. Preparatory to transformer test, two correspondingly positioned terminals on the transformer are connected together and to binding post 15C of the instrument, and the free terminals of the transformer are then connected respectively to binding posts 15A and 15B. Under these conditions, when push button switch 5 is closed positive voltage will be applied to binding post 15C and negative voltage to binding post 15A. If the transformer is connected subtractive, the voltage from binding post 15C to 15A, produced when push button switch 5 is closed, will be the same as that between binding post 15C and binding post 15A, i. e. binding post 15B will be more negative than binding post 15C, and, since binding post 15A is more negative than binding post 15C, the indicator needle 10' of meter 10 will be deflected to the right i. e. to correct indication position, as subtractive polarity is standard. If the transformer connection to the instrument is such as to be additive, then indicator needle 10' of meter 10 will be deflected to the left, i. e. to incorrect indication position. After a transformer test, switch actuator means 20 should be returned to its first position which opens switches 11 and 9 before push button switch 5 is opened, thus avoiding possibility of risk of damage to meter 10.

When the switches 11 and 9 are closed to the above described transformer test circuit establishing condition, the instrument may be used for determining polarity of a direct current machine. In such use of the instrument the field terminal of the direct current machine is connected to the binding post 15A, the armature terminal to binding post 15B, and the common terminal of field and armature to binding post 15C. If then the armature of the direct current machine is turned in the direction in which it is desired to run, if the connections are correct the armature will generate a voltage having the same polarity as the field, and since the binding post 15A (field) is negative, the binding post 15B (armature) will also be negative, and the indicator needle 10' of meter 10 will be deflected to the right, i. e. to correct indication position. If, however, the connections are incorrect, so that the indicator needle 10' is deflected to the left, i. e. to incorrect indication position, then either the field connection or the armature connection must be reversed, if the machine is to build up voltage as a generator, or is to run in a given desired direction as a motor.

In checking the phase rotation of a two phase three wire source, the common lead of the two phases is connected to terminal 14C and the remaining two leads respectively to terminals 14A and 14B. The switch actuator means 20 is moved to its second position to close switch 11 to complete the line test circuit. If then the indicator needle 10' is deflected to the right, i. e. to correct indication position, the leads of the source are marked to correspond to the markings of the terminals A, B and C to which they are connected. If the lead connections are such that the indicator needle 10' is deflected to the left, i. e. to incorrect indication position, the leads connected respectively to terminals 14A and 14B are interchanged, the test then repeated, and if correct indication results, the leads are then marked in correspondence with the markings of the terminals 14.

In testing polyphase machines, resistors 7—7 are so connected in the test circuit that they protect meter 10 against open or short circuits for the reason that one resistor always remains in series with the meter. Said resistors 7—7 act in multiple for normal meter currents thereby increasing meter sensitivity.

It will be understood that various changes could be made in the testing instrument, its circuits and electrical agencies; e. g. two resistors and a resistance could be employed to produce the desired phase displacement instead of two resistors and a reactance; these and other changes could be made within the scope of the following claims.

We claim:

1. In a testing instrument for phase rotation, polarity and other determinations, a first testing circuit for determining phase rotation of a power line and a second testing circuit for determining phase rotation of a power utilization machine, said first testing circuit comprising phase leads to which power line phase conductors can be connected and having two similar impedances connected respectively in two of its phase leads to neutral and an impedance of different power factor characteristics connected in its third phase lead to neutral, whereby the electrical neutral is displaced from true neutral position, said second testing circuit comprising a D. C. power source and phase leads to which windings of a power utilization machine can be connected, a D. C. polarized meter common to both testing circuits, and switch means operable to selectively connect said meter in either of said testing circuits, said D. C. power source of the second testing circuit operating to excite certain windings of a connected power utilization machine when the latter is turned and thereby to induce actuating current flow through the meter.

2. In a testing instrument for phase rotation, polarity and other determinations, a first testing circuit for determining phase rotation of a power line and a second testing circuit for determining phase rotation of a power utilization machine, said first testing circuit comprising phase leads to which power line phase conductors can be connected and having two similar impedances connected respectively in two of its phase leads to neutral and an impedance of different power factor characteristics connected in its third phase lead to neutral, a resistance in series with each impedance of said first mentioned phase leads, rectifiers connected between a movable contact on one said resistance and a corresponding movable contact on the other said resistance whereby to produce a differential voltage between the midpoint of said rectifiers and neutral, said second testing circuit comprising a D. C. power source and phase leads to which windings of a power utilization machine can be connected, a D. C. polarized meter common to both testing circuits, and switch means operable to selectively connect said meter in either of said testing circuits, said D. C. power source of the second testing circuit operating to excite certain windings of a connected power utilization machine when the latter is turned and thereby to induce actuating current flow through the meter.

3. In a testing instrument according to claim 2 wherein the meter is provided with a pivoted normally centered indicator needle, an indicating scale having right and left sections differentiated to respectively indicate correct and incorrect determinations, and electro-magnetic means in series with the D. C. power source of the second testing circuit respectively cooperative with said respective scale sections, whereby to hold the indicator needle of the meter, when deflected, in its first thrown position against oscillation.

4. In a testing instrument according to claim 3 wherein said second testing circuit is provided with a normally open manually closable switch operable to complete said second testing circuit after the meter is connected therein by said first mentioned switch means.

5. In a testing instrument according to claim 2 wherein the meter is provided with a pivoted normally centered indicator needle, and an indicating scale having right and left sections differentiated to respectively indicate correct and incorrect determinations, and said second testing circuit including a potentiometer resistor connected across the D. C. exciting phase leads of said circuit which is operable to adjust the indicating needle of the meter to normally centered position.

6. In a testing instrument according to claim 2 wherein the meter is provided with a pivoted normally centered indicator needle, an indicating scale having right and left sections differentiated to respectively indicate correct and incorrect determinations, and electro-magnetic means in series with the D. C. power source of the second testing circuit respectively cooperative with said respective scale sections, whereby to hold the indicator needle of the meter, when deflected, in its first thrown position against oscillation; and said second testing circuit including a potentiometer resistance connected across the D. C. exciting phase leads of said circuit which is operable to adjust the indicating needle of the meter to normally centered position.

7. In a testing instrument according to claim 6 wherein said testing circuit is provided with a normally open manually closable switch operable to complete said second testing circuit after the meter is connected therein by said first mentioned switch means.

8. In a testing instrument according to claim 2 wherein said second testing circuit is provided with a normally open manually closable switch operable to complete said second testing circuit after the meter is connected therein by said first mentioned switch means.

9. In a testing instrument for phase rotation, polarity and other determinations, a first testing circuit for determining phase rotation of a power line and a second testing circuit for determining phase rotation of a power utilization machine, said first testing circuit comprising phase leads connected to neutral, terminals of a given type from which said phase leads extend and to which power line phase conductors can be connected, two similar impedances connected respectively in two said phase leads to neutral and an impedance of different power factor characteristics connected in a third phase lead to neutral, a resistance in series with each impedance of said first mentioned phase leads, rectifiers connected between a movable contact on one said resistance and a corresponding movable contact on the other said resistance whereby to produce a differential voltage between the midpoint of said rectifiers and neutral, said second testing circuit comprising a D. C. power source and phase leads, terminals differing in kind from the terminals of said first testing circuit to which windings of a power utilization machine can be connected, a D. C. polarized meter common to both testing circuits, switch means operable to selectively connect said meter in either of said testing circuits, and a normally open manually closable switch operable to complete said second testing circuit after the meter is connected therein by said first mentioned switch means.

10. In a testing instrument according to claim 9 wherein the meter is provided with a pivoted normally centered indicator needle, an indicating scale having right and left sections differentiated to respectively indicate correct and incorrect determinations, and electro-magnetic means in series with the D. C. power source of the second testing circuit respectively cooperative with said respective scale sections, whereby to hold the indicator needle of the meter, when deflected, in its first thrown position against oscillation, and said second testing circuit including a potentiometer resistance connected across the D. C. excited phase leads of said circuit which is operable to adjust the indicator needle of the meter to normally centered position.

11. In a testing instrument according to claim 9 wherein said second testing circuit includes a transformer polarity testing circuit adapted to be selectively controlled by said first mentioned switch means whereby to close the D. C. power source across the high voltage winding of a transformer and to connect the meter across the low voltage winding of the transformer with the positive pole of the meter and the positive pole of the D. C. source connected to a common terminal.

12. In a testing instrument for phase rotation, polarity and other determinations, a testing circuit for determining phase rotation of a power line comprising phase leads to which power line phase conductors can be connected and having two similar impedances connected respectively in two of its phase leads to neutral and an impedance of different power factor characteristics connected in its third phase lead to neutral, a resistance in series with each impedance of said first mentioned phase leads, rectifiers connected between a movable contact on one said resistance and a corresponding movable contact on the other said resistance whereby to produce a differential voltage between the midpoint of said rectifiers and neutral, a D. C. polarized meter, and switch means for connecting said meter in the testing circuit.

13. In a testing instrument for determining the rotation of phase voltage in a rotating three phase A. C. machine for a given shaft rotation of said machine, a testing circuit comprising a D. C. power source and phase leads to which windings of said machine can be connected with certain of said phase leads being connectable to certain windings of said machine whereby the D. C. power source can excite the latter, and a polarized D. C. meter, another phase lead connectable to the remaining winding of said machine with said meter connected therefrom to the midexciting point of said exciting phase leads, whereby when the machine shaft is turned in desired direction of rotation the meter will be actuated to indicate correct or incorrect phase rotation of the windings for said desired direction of machine shaft rotation, and switch means for closing said testing circuit.

14. In a testing instrument according to claim 13 wherein the meter is provided with a pivoted normally centered indicator needle, an indicating scale having right and left sections differentiated to respectively indicate correct and incorrect phase rotation, and electro-magnetic means in series with the D. C. power source respectively cooperative with said respective scale sections, whereby to hold the indicator needle of the meter, when deflected, in its first thrown position against oscillation, and said circuit including a potentiometer resistance connected across the D. C. excited phase leads and operable to adjust the indicator needle of the meter to normally centered position.

RAYMOND A. HUSE.
FRAZER W. GAY.

No references cited.